UNITED STATES PATENT OFFICE.

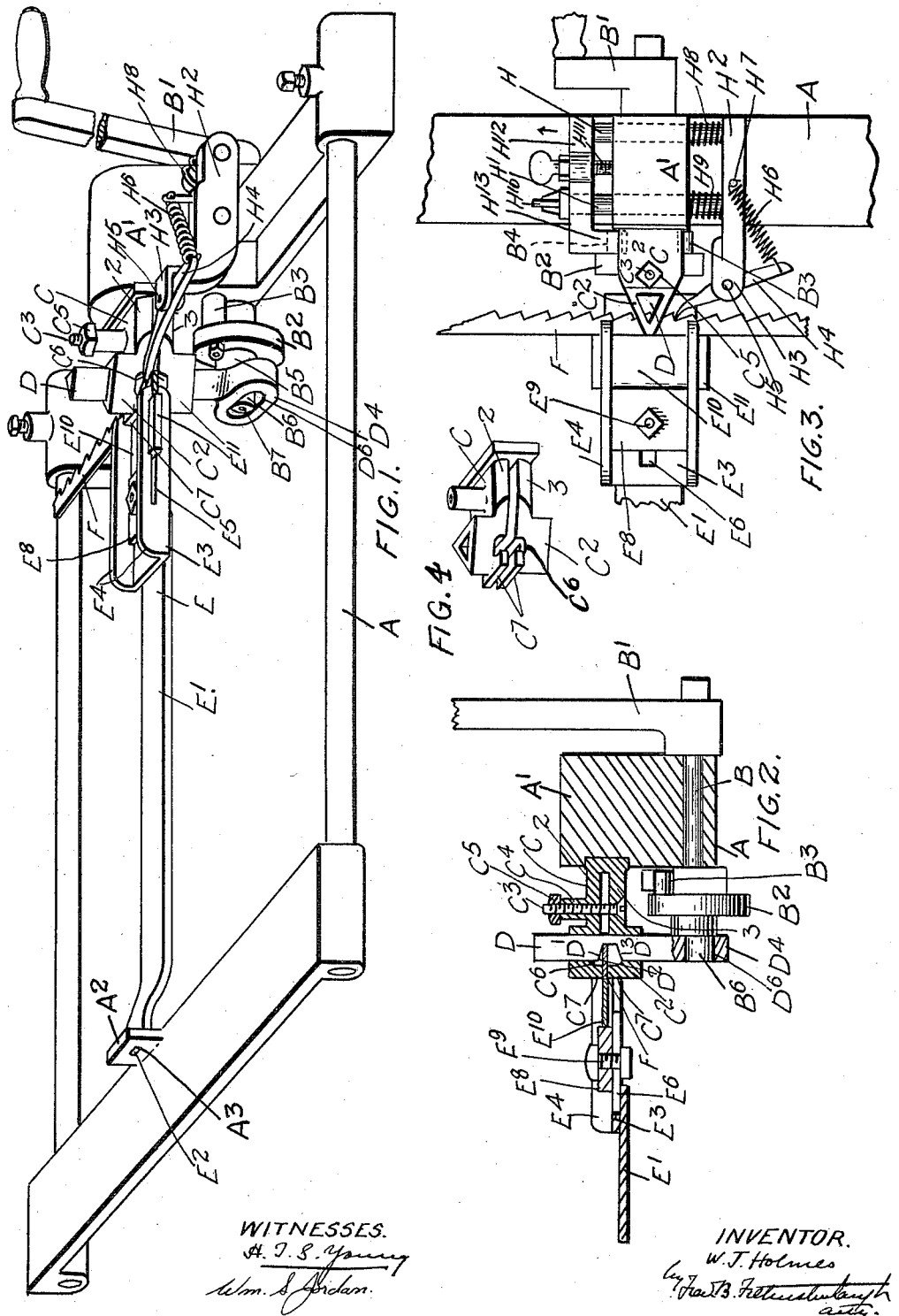

WILLIAM JOHN HOLMES, OF TORONTO, ONTARIO, CANADA.

SAW-SETTING MACHINE.

1,078,855.  Specification of Letters Patent.  Patented Nov. 18, 1913.

Application filed November 25, 1912. Serial No. 733,314.

*To all whom it may concern:*

Be it known that I, WILLIAM JOHN HOLMES, of the city of Toronto, in the county of York, in the Province of Ontario, Canada, have invented certain new and useful Improvements in Saw-Setting Machines, of which the following is the specification.

My invention relates to improvements in saw setting machines, and the object of the invention is to devise a simple form of machine, which will rapidly set in alternate directions the teeth of the saw and which may be adjusted to set teeth of any size or form and it consists essentially of a saw holding device having a horizontal slot through which the saw is fed, a vertically movable plunger held within the holding device, means for reciprocating the plunger vertically, means for feeding the saw tooth by tooth after each vertical movement of the plunger, and means for adjusting such feeding means to feed different sizes of teeth through the holder as hereinafter more particularly explained by the following specification.

Figure 1, is a general perspective view of my device. Fig. 2, is a vertical section through the operating portion shown in Fig. 1. Fig. 3, is a plan view of the parts shown in Fig. 2. Fig. 4, is a perspective detail of the saw holding arm.

In the drawings like letters of reference indicate corresponding parts in each figure.

A is the main frame provided at one end with a bearing standard $A'$ and at the opposite end with a lug $A^2$ having a horizontal slot $A^3$.

B is the operating shaft journaled in the standard $A'$.

$B'$ is an operating crank secured on the outer end of the shaft B.

$B^2$ is a disk secured to the shaft B at its opposite or inner end.

$B^3$ and $B^4$ are rollers journaled on the outer face of the disk $B^2$.

$B^5$ is a boss extending from the inner face of the disk $B^2$.

$B^6$ is a roller journaled on a pin $B^7$ extending eccentrically from the boss $B^5$.

C is an arm extending rearwardly from the standard $A'$. Such arm is provided with an enlarged outer end $C^2$ preferably triangular in plan section. The arm C is a divided arm, the members 2 and 3 of which may be drawn together by the screw $C^3$ extending through the arm C and through the boss $C^4$ extending upwardly from the member 2.

$C^5$ is an adjusting nut by means of which the members of the arm may be readily drawn together.

$C^6$ is an opening extending through the enlarged triangular portion $C^2$ of the arm C.

$C^7$ are laterally extending gripping portions located above and below the saw.

D is a setting plunger vertically and slidably held within the enlargement $C^2$ of the arm C. The plunger D is provided with a setting notch $D'$ having upper and lower inclined setting surfaces $D^2$ and $D^3$.

$D^4$ is the enlarged lower end of the setting plunger D having the horizontal slot $D^6$ therein.

E is a saw holding device comprising an arm $E'$ having a teat $E^2$ at one end thereof fitting into the slot $A^3$ of the lug $A^2$. The other end of the arm $E'$ is provided with an enlargement $E^3$ having side flanges $E^4$ provided with longitudinal slots $E^5$ open at one end. The enlargement $E^3$ is also provided with a vertical slot $E^6$.

F is the saw, which fits at its base within the ends of the slots $E^5$.

$E^8$ is an adjustable piece secured in position by the bolt $E^9$ secured in the slot $E^6$.

$E^{10}$ is a strip of metal fitting in the slot $E^5$ between the back of the saw and the piece $E^8$ and of substantially the same thickness as the saw. The strip $E^{10}$ is provided with enlarged ends $E^{11}$ to prevent lateral movement within the slots $E^5$.

H and $H'$ are rods slidably held within the bearing $A'$ and extending parallel with the saw.

$H^2$ is a cross piece secured on the cross rods H and $H'$ and provided with bearing lugs $H^3$ between which the feeding pawl $H^4$ is journaled by the pin $H^5$.

$H^6$ is a tension spring connecting the free end of the pawl to the pin $H^7$ extending upwardly from the piece $H^2$.

$H^8$ and $H^9$ are compression springs extending between the piece $H^2$ and the standard $A'$.

$H^{12}$ is a piece secured on the opposite end of the rods H and $H'$. The piece $H^{12}$ is provided with an inward extension $H^{13}$ located in the path of travel of the rollers $B^3$ and $B^4$.

$H^{10}$ is a wing nut threaded on to the end of the bar $H'$ against the piece $H^{12}$.

$H^{11}$ is a set screw extending through the piece H¹² against the standard A'. The bars H and H' and pieces H² and H¹² form a movable frame carrying the feed pawl H⁴.

Having described the principal parts involved in my invention I will briefly describe the operation of the same. By turning the crank B', the shaft B and disk B² are rotated carrying the rollers B³ and B⁴ alternately into engagement with the extension H¹³ of the piece H¹² and forcing such piece in the direction of arrow (see Fig. 3) carrying with it the rods H and H' and piece H² against the compression of the springs H⁸ and H⁹ and the feed pawl H⁴ against the base of one of the saw teeth to feed the saw longitudinally between the portions C⁷. Immediately one of the rollers H³ and H⁴ has passed the extension H¹³ the compression springs H⁸ and H⁹ carry the piece H² and the feed pawl H⁴ rearwardly from the base of one tooth into position against the base of the next adjacent tooth. To prevent the saw from moving rearwardly as the feed pawl moves rearwardly I tighten the nut C⁵ on the bolt C⁴ so as to spring the members of the arm C together to grip the saw between the portions C⁷ sufficiently to prevent such rearward movement and yet allow of the forward movement to feed the saw through the setting plunger. Alternately with the above operation the roller B⁶ reciprocates the plunger D alternately carrying the faces D² and D³ against the upper and lower faces of each alternate tooth to set them in opposite directions. To vary the distance of the feed according to the different sizes of teeth I tighten or loosen the nut H¹⁰ thereby varying the distance which the piece H¹² is carried in the direction indicated by arrow when the rollers B³ and B⁴ are brought into engagement with the extension H¹³. To insure of the pawl coming opposite the base of the teeth after each rearward movement I have provided the set screw H¹¹ which as such rearward movement is completed strikes against the standard H' limiting the movement in the direction opposite to the direction of arrow.

From this description it will be seen that I have devised a very simple device whereby saw teeth of any size and form may be very rapidly set in alternate directions as required.

What I claim as my invention is.

1. In a saw setting machine, the combination with the saw holding mechanism, of means for feeding the saw tooth by tooth through such holding means comprising a drive shaft, a disk carried by said shaft, a horizontally movable frame having a projection thereon, horizontal rollers carried by said disk adapted to strike against said projection and move said frame, means for returning said frame to its normal position, a spring pressed pawl carried by said frame adapted to engage the teeth on said saw, and means for automatically setting each tooth in alternate directions, as and for the purpose specified.

2. In a saw setting machine, the combination with a saw holding device, of means for feeding the saw tooth by tooth through the saw holding device, a vertically movable setting plunger, and means for imparting vertical movement thereto to set the saw teeth in alternate directions comprising a slotted end on said setting means, a drive shaft, a disk carried by said shaft, a boss on the inner face of said disk, a pin extending eccentrically from said boss, and a roller carried by said pin, adapted to move in the slotted end of said setting means, as and for the purpose specified.

3. In a saw setting machine, the combination with the saw holding device, of means for feeding the saw tooth by tooth through the saw holding device, a vertically movable setting device designed to set each tooth in alternate directions, and means for operating such setting device comprising a slotted end on said setting means, a drive shaft, a disk carried by said shaft, a boss on the inner face of said disk, a pin extending eccentrically from said boss and a roller carried by said pin, adapted to move in the slotted end of said setting means, as and for purpose specified.

4. In a saw setting device, the combination with the main frame, of a holding device comprising a horizontally divided arm extending above and below the saw and designed to grip the upper and lower surface thereof, means for feeding the saw tooth by tooth between the gripping portions of the arm, vertically operated means for setting the teeth and means for operating such setting means comprising a slotted end on said setting means, a drive shaft, a disk carried by said shaft, a boss on the inner face of said disk, a pin extending eccentrically from said boss, and a roller carried by said pin, adapted to move in the slotted end of said setting means, as and for the purpose specified.

5. In a saw setting device, the combination with the main frame, of a holding device comprising a horizontally divided arm extending above and below the saw and designed to grip the upper and lower surfaces thereof, means for feeding the saw tooth by tooth between the gripping portions of the arm, a vertically movable reciprocating plunger having tooth setting faces designed to be brought alternately into engagement with each alternate tooth to set them in opposite direction, and means for imparting vertical reciprocating movement to the plunger comprising a slotted end on said setting means, a drive shaft, a disk carried by said shaft, a boss on the inner face of said disk, a pin extending eccentrically from said boss, and a roller carried by said pin, adapted to move in the slotted end of said setting means, as and for the purpose specified.

6. In a saw setting device, the combination with the main frame, of a saw holding device comprising a horizontally divided arm extending above and below the saw to grip the upper and lower faces thereof, and a backing member designed to bear against the back of the saw to hold it in place between the gripping members, means for feeding the saw tooth by tooth between the gripping members of the arm, and vertically operated means for setting the teeth as the saw is fed through the holding device comprising a slotted end on said setting means, a drive shaft, a disk carried by said shaft, a boss on the inner face of said disk, a pin extending eccentrically from said boss, and a roller carried by said pin, adapted to move in the slotted end of said setting means, as and for the purpose specified.

7. In a saw setting device, the combination with the saw holding device and setting plunger, of a feeding device comprising a suitably supported movable carriage, a projection on said carriage, a feeding pawl carried by the frame and contacting with the teeth of the saw, a main shaft, means for rotating the main shaft, compression springs, means for moving the carriage against the compression of the springs operated by the rotation of the main shaft comprising a disk carried by the shaft, rollers thereon, adapted to move against said projection, as and for the purpose specified.

8. In a saw setting device, the combination with the saw holding device and setting plunger, of a feeding device comprising a suitably supported movable carriage, a projection on said carriage, a feeding pawl carried by the carriage and engaging the tooth of the saw, a main shaft, means for rotating the main shaft, compression springs, means for moving the carriage against the compression of the springs operated by the rotation of the main shaft comprising a disk carried by the shaft, rollers thereon, adapted to move against said projection, and means for varying the movement of the carriage in accordance with the size of the teeth to be fed, as and for the purpose specified.

WILLIAM JOHN HOLMES.

Witnesses:
M. EGAN,
N. HAYES.

---

Copies of this patent may be obtained for five cents each, by addressing the "Commissioner of Patents, Washington, D. C."